(12) United States Patent
Koeninger (10) Patent No.: US 10,157,183 B2
(45) Date of Patent: Dec. 18, 2018

(54) REAL TIME AND SCALABLE SPACE-TIME DATA RECOVERY

(71) Applicant: International Business Machines Corporation, Armonk, NY (US)

(72) Inventor: R Kent Koeninger, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/221,162

(22) Filed: Jul. 27, 2016

(65) Prior Publication Data

US 2017/0031928 A1 Feb. 2, 2017

Related U.S. Application Data

(60) Provisional application No. 62/197,597, filed on Jul. 28, 2015.

(51) Int. Cl.
*G06F 17/00* (2006.01)
*G06F 17/30* (2006.01)
*G06F 11/14* (2006.01)

(52) U.S. Cl.
CPC .... *G06F 17/30073* (2013.01); *G06F 11/1451* (2013.01); *G06F 11/1469* (2013.01); *G06F 2201/80* (2013.01); *G06F 2201/84* (2013.01)

(58) Field of Classification Search
CPC ............................ G06F 17/30; G06F 17/30073
USPC .................................................. 707/600–899
See application file for complete search history.

(56) References Cited

U.S. PATENT DOCUMENTS 9,659,021 B1 * 5/2017 Dobrean ........... G06F 17/30091

OTHER PUBLICATIONS

IBM Patents or Patent Applications Treated as Related.

* cited by examiner

*Primary Examiner* — Isaac M Woo
(74) *Attorney, Agent, or Firm* — Jeffrey S. LaBaw; Robert Sullivan; Feb R Cabrasawan (57) ABSTRACT

Time based protection of data stored in a source volume of a computer system is accomplished by performing a set of backups for the computer system, each backup a full image for a respective backup time. The set of backups is stored in a filesystem format. Each respective backup is stored as a directory in a directory structure. A respective timestamp is associated with each backup. The respective timestamp is representative of the respective backup time. The set of backup directories is indexed according to the associated timestamps.

20 Claims, 6 Drawing Sheets

| 2015 | 03 | 08 | | | |
| 2014 | 04 | 12 | | | |
| 2013 | 05 | 15 | 12 | 52 | PM |
| 2012 | 06 | 20 | | | |
| 2011 | 07 | 23 | | | |

*FIG. 6*

REAL TIME AND SCALABLE SPACE-TIME DATA RECOVERY

REFERENCE TO PROVISIONAL APPLICATION

This application claims benefit of U.S. provisional application, Ser. No. 62/197,597 which is hereby incorporated by reference.

TECHNICAL FIELD

Various embodiments relate to methods and systems for time-based data protection.

BRIEF SUMMARY

According to this disclosure, a method, apparatus and computer program product for data recovery are described. Time based protection of data stored in a source volume of a computer system is accomplished by performing a set of backups for the computer system, each backup a full image for a respective backup time. The set of backups is stored in a filesystem format. Each respective backup is stored as a directory in a directory structure. A respective timestamp is associated with each backup. The respective timestamp is representative of the respective backup time. The set of backup directories is indexed according to the associated timestamps.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

DETAILED DESCRIPTION

The following detailed description refers to the accompanying drawings. The same or similar reference indicators may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose methods and system for time-based data protection and resiliency as described below. In some embodiments, such systems are called Continuum, or Continuum Navigator.

The following lists some of the features in various embodiments and the mechanisms for implementing those features.

The embodiments of the Continuum Navigator are based on the rationale that backup systems are useless by themselves; what one needs are restore systems. The implementations of the various layers and features of the example embodiments would most likely be released in a series of application releases for a series of data servers. Those skilled in the art will understand that refinements and enhancements can be made to the exemplary embodiments described in the specification Data backup is a well-known art. However, interfaces to restore backup data are often difficult, unintuitive and lack functionality. A goal of the present invention is to present the backups with well-known and augmented interfaces such that one can restore files without a manual or instruction with powerful tools to search for the desired data through time.

For example, a known backup system with a restore interface that is sub-optimal. The restore interface is slow (not real-time) and cumbersome when compared to common drag and drop interfaces. The restoration process is also complex and fragile to be the point of being unreliable. It also has a cumbersome interface for selecting a particular backup time.

The human interface and functionality of Continuum Navigator is designed to be intuitively usable by non-technical people, including setup, periodic backups, simple and complex searches, restoring files and folders, full restores, business continuity, and automatic maintenance of used capacity such that it will never fill up a physical volume.

Advances described in this disclosure center on creating real-time directory, filename, and content data searches through all backups going back through time, doing so with intuitive interfaces that advance the state of the art beyond existing implementations, and with simple and reliable designs. Embodiments of the invention also create backups in forms that enable the rapid and intuitive restores based on simple and reliable implementations.

Embodiments of the invention provide not only the productivity of searching backups through time, but also business continuity (minimum down time) that after a system media failure. A user can be back being up and running in the short time it takes to boot the Mac or PC by rebooting onto the Continuum. Some backup programs are searchable through time and some are bootable but none are known to have been designed to do both. In this preferred embodiment, these are integrated implementations, which maintains simplicity and presents the bootable Space as the first of the past-time Spaces, included in the search through all of the past-time spaces.

This system is designed from the ground up to do both, do them efficiently, and to do them reliably. The preferred embodiment uses a single directory structure for both the bootable most-recent backup and multiple past-time backups. This enables efficiently transforming the bootable backup to a past-time backup changing only a few pointers when creating a new most-recent bootable backup.

A preferred embodiment's design maximizes reliability by using industry-standard filesystem directory structures to organize the backups and the folders and files within each backup. It also uses standard operating system functions to reference these structures. Thus it is highly reliable, having been designed using data structures and code that is used by the vast majority of the computer industry.

An additional feature is using files stored in past-time "Spaces" in place, without restoring them. In the preferred embodiments, a user cannot modify them since backups are immutable (frozen in time) to aid in searching speed. An example interface in embodiments would allow double clicking on a backed up Word file in a Finder to use the Word application to display and search a read-only copy of that file as of the time of that Space. To the author's knowledge, this is a unique feature in the art of time-based backup systems.

Preferred embodiments of the invention can run on multiple operating systems, including, but not limited to Mac OS X and Microsoft Windows. This patent routinely references embodiments on OS X, Windows, and PCs. When doing so does not imply it applies to only these operating systems and to small computer such as PCs. For example, embodiments could also work on small to medium Linux and Unix workstations using their native user interfaces in addition to the Continuum Navigator interfaces. References to directories and folders are interchangeable. References to a "Finder" interface include features common to the Mac OS X, Windows, and other common volume, directory and file human interfaces.

"Navigation" is searching through volumes, directories, filenames, and file content through time without having select individual times. This is a powerful capability that, to the author's knowledge, is not implemented with an intuitive and real-time interface in other backup systems.

Figure 6:
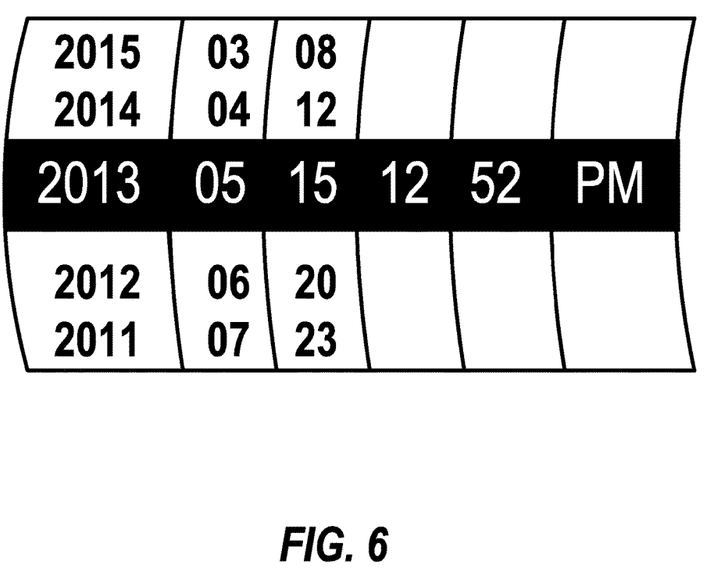
FIG. 6 shows that in some embodiments a time dial user interface enables dialing easily back through time, and skipping through months or years with one click.

A user can use dual Continuum Navigator Windows to search through time as fast as a user can dial the Time Dial to jump minutes, hours, days, months or years at a time. One embodiment of the Time Dial is shown in FIG. 6. A user can also use standard command line interfaces, OS commands, scripts, and applications.

The preferred embodiment supports backing up multiple physical or logical volumes onto one physical backup volume while maintaining them as logically separate backup volumes. This is valuable for backing up the internal system volume plus external volumes. This utility is important for enabling the same intuitive method for protecting data on the system volume to be used for protecting data on external disks. This important utility is unique in the industry.

This summary features described above are explained in greater detail elsewhere.

In one preferred embodiment of the invention, the Continuum Navigator addresses and retrieves data created at most times since the time of an original backup with time-based complete-filesystem images as they were at the time of their backups. It delivers real-time and scalable data recovery.

The goals of preferred embodiments of the invention include rapid and intuitive navigation through spaces (such as filesystems) and time (data in previous-time spaces, such as in backups). Preferred embodiments of the invention create, maintain, and present complete past-time images (mainly filesystem images) from periodic backups of present-time object images. The indexing of past-time spaces (mostly competed images of filesystems as of the time of a backup) such that one can rapidly (perceptively instantaneously displaying the content of selected folders as times for them are selected (dialed), navigate the spaces (mostly searching filesystems) and rapidly index back in time are provided by preferred embodiments of the invention. In embodiments, scalability is achieved by rapid indexing, navigation, and data retrieval.

The Continuum Filesystem (CNTFS) section describes a key component for Continuum's navigation speed at searching through Space (with the Continuum Navigator GUI). Users can use the files the CNTFS without having to restore them as the files are in read-only directories, essentially frozen in time and Continuum's ability to store and access billions of iNodes.

The Rapid disaster recovery section describes disaster recovery on personal computers. The Major concepts for implementation section describes some of the consideration for implementing a storage according to preferred embodiments of the invention.

The Continuum Filesystem Sever (CTNFS):

In one preferred embodiment, the root would be "./" indexed by "._times/timestamp/" and the timestamp format could be YYYYMMDDHHDD. This refers to "YYYY" for years, "MM" for months, "DD" for days and MM" for minutes (no seconds). The root would be linked to the root of the recently appended Space. Thus, each Space points to respective backups at a particular timestamp.

Backups are immutable—frozen in time. Thus, the Space directories are write-once, read-seldom structures.

In preferred embodiments of the invention, the OS mounts CNTFS as it would any filesystem. This presents users with a standard filesystem API. The users can change times by using a Time Dial interface in Finder interface described elsewhere or CD commands in Linux. For the latter the user would search /._times/timestamp for Spaces at a time they want to navigate and CD to that Space. The users could navigate using standard Mac, PC or Linux commands and APIs, since it is a standard filesystem. Changing "times" would be as fast as changing directories (perceptively instantaneous), since it would literally be changing directories.

As mentioned elsewhere, iNodes in each space have symlinks to the files in preferred embodiments of the invention. Many files will be linked from many Spaces. As noted elsewhere, an efficient method to cull Spaces and locate files that then would have no links so they could be deleted. This also means iNodes can be linked to directories and files not in CNTFS.

In embodiments, Continuum provides two access methods to search through Space and time. The Continuum Navigator graphical user interface (GUI) presents a present-time Finder window, a past-time Finder window and a Time Dial. The GUI has the ability to drag and drop from the past-time window to the present-time window. It includes a Search facility to rapidly search through time for directory names, filenames, and file content using standard search options and Booleans. A user could select a found file and open it in the past-time Finder window. Once located, these files can be opened with a double click without having to restore them to the present-time Space. As mentioned elsewhere, each Space is a read-only directory. On operating systems that support this feature, once one found the target directory, one could open that directory and use a native-OS Finder window. Alternatively, a user could change the present-time Finder window to point to that directory in present-time.

The other access method to search is the set of standard Linux commands and APIs. For example, in Linux, to find a Space at a time, the user would change directories using the change directory command, i.e. "Cd/_times/". Then the user would list the timestamps stored in the times directory with the Ls command. Then, the user would enter Cd to timestamp/ which was desired, i.e. the one is then at the root of that time's Space. It would be easy to create scripts that for a given directory would change times for from that directory to that directory at a different time.

Continuum Navigator scales as its address data is created at many times (since an original backup) with time-based complete-filesystem images as they were at the time of their backup. It delivers real-time and scalable data recovery. Continuum Navigator scales the numbers of files by using a filesystem image per time of each backup. In a preferred embodiments of the invention, it uses a full filesystem image, an Node for every directory and file in that filesystem as that time of backup, for all backup times maintained since the initial backup. Multiple-hardware-disks per volume can be used on Macs and PCs.

Continuum Navigator scales real time, fast searches using direct access to directories that map to all incremental and other backups. Continuum Navigator also scales with high speed, low overhead-per-transaction searches to create and maintain the Continuum "four-dimensional" space that points to all directories files at all times.

The inventor uses the imagery of Continuum Navigator "sailing" through four dimensions of space-time to describe how it quickly locates and recovers lost or damaged computer files from "everywhere" and "everywhen". It searches the "everywhere" in three spatial dimensions: Directory nodes (their location and names), file soft and symlinks (their location and names), and files (the location of a byte (or other search criteria) in the content). Continuum Navigator searches "everywhen" in time, i.e. from now back to the beginning of backup time.

The high-speed, high capacity database of directories and files is called a Continuum. Continuums scale to hold billions or more iNodes with fast access and maintenance performance (including iNode creation rates). A set of full filesystem images each for a given time are called "Spaces."

Preferred embodiments of the invention have several software components:

The Continuum Navigator is the search engine and rapidly searches through Space and time. The Dual-Continuum-Finder window is a user interface. One of the windows portrays files for the present time. The other window is for a selected past time. Using the interface, a user drags and drops files from the past to the present. Some embodiments of the invention use "wormholes", symlinks to a Continuum directory into a user's present-time Space. Another user interface object is called a Time Dial. The Time Dial is a GUI element showing years, months, days, hours, and minutes and preferably displays only times for which backups are indexed.

A Continuum Creator is used to create and maintain Continuums.

On systems with limited physical storage to maintain sufficient operating capacity, a Continuum Creator culls old backups. In preferred embodiments of the invention, the Creator culls with smaller steps between time for earlier backups and larger steps between backups for later backups, never deleting the original backup.

The Continuum Recreator copies a Space from a Continuum onto a disk or partition. It is used for a "full restore" disaster recovery when the system media was replaced. In preferred embodiments of the invention, it performs a full restore from any selected time.

The Continuum Daemon performs background functions. It also performs functions that require system privileges.

In some respects, Continuums are frozen in time, at least with respect to the already stored data. However, one can add new Spaces for new backup times. Existing Spaces within an existing Continuum are immutable according to preferred embodiments of the invention. These properties of a Continuum enable a user to change directories to the time and space of any directory and then run applications on those files (and others in any directory) without having to restore them. Given that changing time is as fast as changing directories, a user can navigate looking for files through time as fast one's eyes can see.

Embodiments of the invention also include a construct called a "Universe", "Parallel Universe" or "Multiverse" which is described in greater detail below. In these embodiments, "adjacent" Parallel Universes means that more than one Universe in a hard partition or a disk. In the storage art, the "universes' are also known as soft partitions. They share the capacity of the disk or hard partition. These constructs enable backing up multiple disks or hard partitions onto one larger hard disk or hard partition. They also enable creating Continuums in user directories. The universes are useful for using remote servers to backup local Macs and PCs for automatic NAS or off-site backups.

Rapid Disaster Recovery

Continuum meta-directories index the time of each past-time Space. In preferred embodiments of the invention, the most-recent past-time Space is special. It is visible and bootable. This allows a user to boot a Continuum, enabling instant resumption of operations, continuous operation while system media is under repair, operation on loaner hardware while the main Mac or PC is in for repairs, and rapid full restores once the system media is repaired and ready for use.

When a new volume is ready to populate, the Continuum Recreator (the full-restore program) copies a Space creating a present-time Space, presumably onto the media that was replaced. In other words, it performs a full restore onto the system-disk or the system-flash. Since both Spaces are real directories, the restore proceeds at the rapid rate of normal filesystem copies.

Copying present-time to present-time Spaces is described above. This can be used to copy present-time Spaces onto other Macs or PCs (particularly new workstations). After booting the new hardware, that Space is exactly as it were on the old hardware, including all applications and preferences, right down to the content of caches.

In preferred embodiments of the invention, there is a Continuum Creator nuance: After copying a filesystem to new hardware, one can resume backing up into existing Continuums. This is because Continuum Navigator matches on visible volume names, not low-level identifiers that are unique on each physical volume.

Some other time-based backup systems do the latter. The physical-media indices change when system media is replaced. This causes those backup systems to create entire new Continuums, where the beginning of time is the time of booting onto that new system volume (no past-time filesystem images). The first backup is time and space consuming. It performs a full backup, copying the current-time filesystem into the new Continuum. Afterwards there would be two large Continuums in the same backup volume, which could overflow the capacity of that volume, causing the backup to fail. Recovering from that situation would require advanced knowledge of Continuums to deleted the old Continuum or copy it to other media before deleting it.

In preferred embodiments of the invention, Spaces are intelligently culled such that time between Spaces increases with age. The inventor calls this process "Time dilation". The beginning of time never changes; the oldest-time Space is always retained. However, the time between the oldest-time Space and its next-younger Space will be longer than the time between the most-recent Space and its next-oldest one, with time jumps between Spaces increasing going back in time.

Continuum Creator uses symlinks in preferred embodiments of the invention because files and directories can span volumes. Backups are immutable so symlinks are stable.

Major Concepts for Implementation:

Continuum meta information is stored in shadow directories that hold time-indexed filesystem images. Shadow directories also hold volume-indexed Parallel Universe volumes. In preferred embodiments of the invention, the Continuum organization is as follow:

Continuums are comprised of Space-time directories and Space-time backup repositories. The three "spatial" dimensions are directory nodes (their location and names); File symlinks (their location and names) and Files (their location and content). A first type of Space-time directory is a "Space", Spaces are spatially dimensional full-filesystem images. That is, a Space contains a filesystem image as it was at time=timestamp. A Space has one time dimension. Timestamps are used in preferred embodiments of the invention to index a time for each Space. For example, the format: YYYYMMDDHHMM can be used as an index. A second type of Space-time directory is a Time. Spaces and times are analogous dimensions; they do not differ physically. Spaces are directories, and have locations in a directory structure. Times are directories, and have locations of directories in time. As Spaces and Times are both directories, Continuum Navigator can sail through time as fast and sailing though filesystems (Spaces).

The navigation rate among Spaces is related to the latency to change directories (perceptively instantaneously).

Embodiments of the invention are used for incremental and continuous backups. In the case of an incremental backup, one Space is created per incremental time. In the case of a continuous backup, one Space is created per time period.

The Continuum Creator creates and maintains the backup Spaces through Times. The Continuum Creator indexes these files into navigable Space-time directories, i.e. one Space per backup time. In preferred embodiments of the invention, one and only one copy of each file with symlinks from one or more Spaces. In embodiments, all files are stored on a single Continuum volume.

The Continuum Navigator is a GUI that acts as a "Finder" that navigates through space and time. One embodiment of the invention uses one Finder window for the present-time Space and a second Finder window for past-time Spaces. A Time Dial is used to move fluidly back and forth though time. The system can move through the Spaces in real time as quickly as the system can change directories and display folders/files in a folder. In a preferred embodiment of the invention, a user can drag and drop to restore folders/files. Double clicking on files in the past-time Finder window opens the older versions of files using their native application. Embodiments of the invention use a "Wormhole" GUI feature which connects a selected past-time to a present-time folder.

The Continuum Daemon performs tasks such as running periodic backups in the background (not visible to the users).

Shadow directories are hidden directories used to organize Spaces, Parallel Universes (soft partitions). In preferred embodiments of the invention, the Parallel Universes are shadow directories that can be indexed at the top of a Continuum or in a user directory.

Dual-Finder Interface

Figure 2:
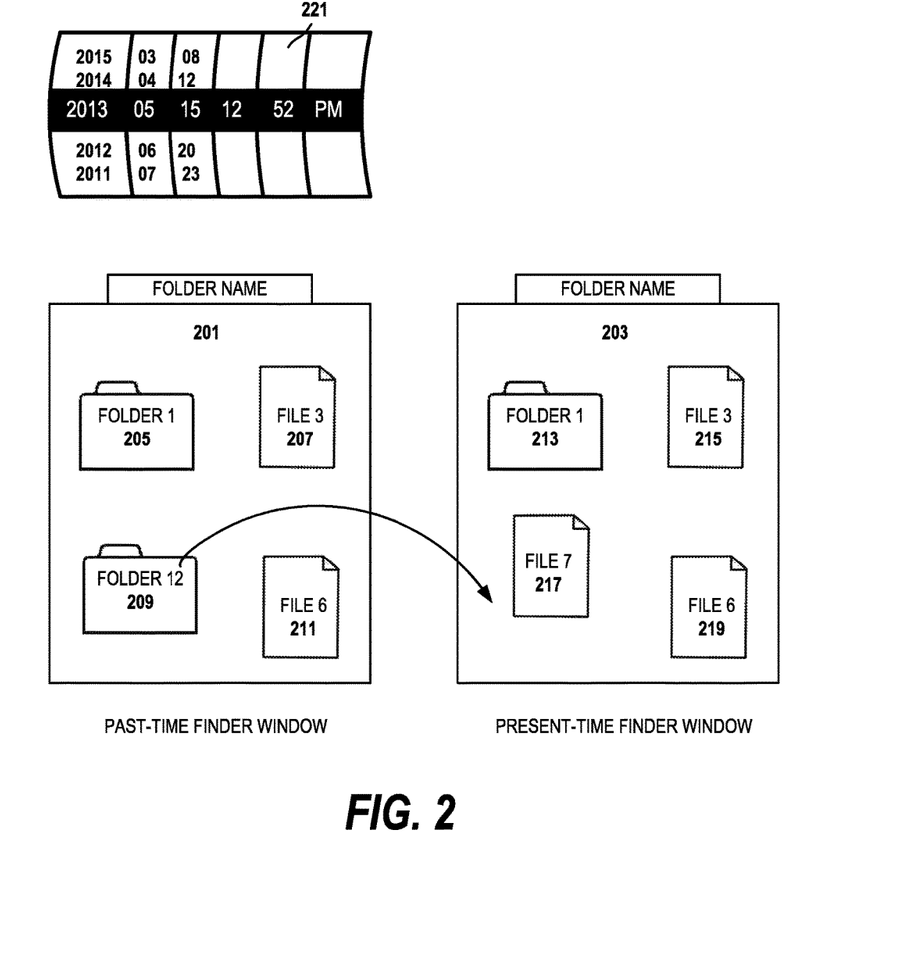
FIG. 2 shows that some embodiments enable navigating quickly and easily through space and time and drag and drop to retrieve files through the use of a user interface.

FIG. 2 illustrates dual-Finder windows used in embodiments of the invention. The past-time window 201 is shown containing icons representing Folder 1 205, File 3 207, Folder 12 209 and File 211. The present-time finder window 203 is shown containing icons representing Folder 1 213, File 3 215, File 7 217 and File 6 211. The present-time finder window 203 is a Continuum-Finder window for the current time. One use for the interface is where a user locates the desired place/time from which to restore. In one embodiment, the user selects a folder in the present time window 203 and the user clicks on a "Start Here" button. The Continuum Navigator opens the past-time finder window 201 at that location, i.e. for that Space. In preferred embodiments of the invention, the past-time window uses the Time Dial 221 to adjust which Space (browse through locations and time) is represented in the past-time window. The Time dial 221 is described in greater detail below in connection with FIG. 6.

Using the GUI, a user navigates through time and locations. There are OS specific dual-Finder windows in preferred embodiments. If the OS supports reading the folder-location of the current active Finder folder in use by the OS-Finder, the Continuum Navigator uses an OS-Finder window for the current time.

A user can drag and drop a file from a Continuum-Finder window to a Continuum-Finder window or to an OS-Finder window to recover files. FIG. 2 depicts the user dragging and dropping Folder 12 209 into the present-time finder window in a copy operation. A user can double click on files in the Continuum-Finder window to open them in their associated application without having to restore them. This feature is useful for rapid document viewing.

In preferred embodiments of the invention, a user cannot add, modify or delete files shown in the past-time Continuum-Finder window 201 as the past Continuums are read-only directories.

The specification gives example implementations of preferred embodiments of the invention. However, those skilled in the art would recognize that these ideas could be implemented in multiple ways which diverge from this examples, but remain within the scope and spirit of the invention. Embodiment can be implemented with varying file systems, operating system APIs, and varying GUIs. For example, embodiments of the invention implemented on Mac OS X, Linux, and Windows would respective use directories and files in Linux and Unix (Mac OS X), and Hidden file/folder attributes in Windows (attrib+h). Example filesystems suitable for the invention include Mac OS Extended (Journaled), ext3, ext4, and NTFS. Commands might be expressed in the form used in any of these three operating systems or in a high-level command that would map to these operating systems.

Shadow Directories:

Shadow directories are directory structures used on Continuum backup partitions and volumes for efficiency, speed, scalability, versatility, simplicity, and reliability. In embodiments, the shadow directories can be used for multiple purposes. The specification describes three such uses. The characteristics of shadow directors match those of standard filesystem directories as they are actually standard directories. Thus, all filesystem operations such as removing or copying files (e.g., the Linux cp command), listing directories (the Linux ls command), searching for files or directories (The Linux find command), changing-to directories (the Linux cd command), searching file contents (the grep command), creating files/directories, and deleting file/directories, all run at standard sub-second filesystem speeds.

Continuum Creator creates a shadow directory each time it runs an incremental backup. In the terminology of the specification, these shadow directories are called Spaces. In preferred embodiments of the invention, there is a time stamped shadow directory for each incremental-backup going back in time. These are complete-filesystem directories. They index every file and folder as of that backup time rather than just indexing the incrementally backed up files and folders. This enable a user to restore any group of files or directories or an entire volume from any shadow directory and thus from any backup time.

Figure 1:
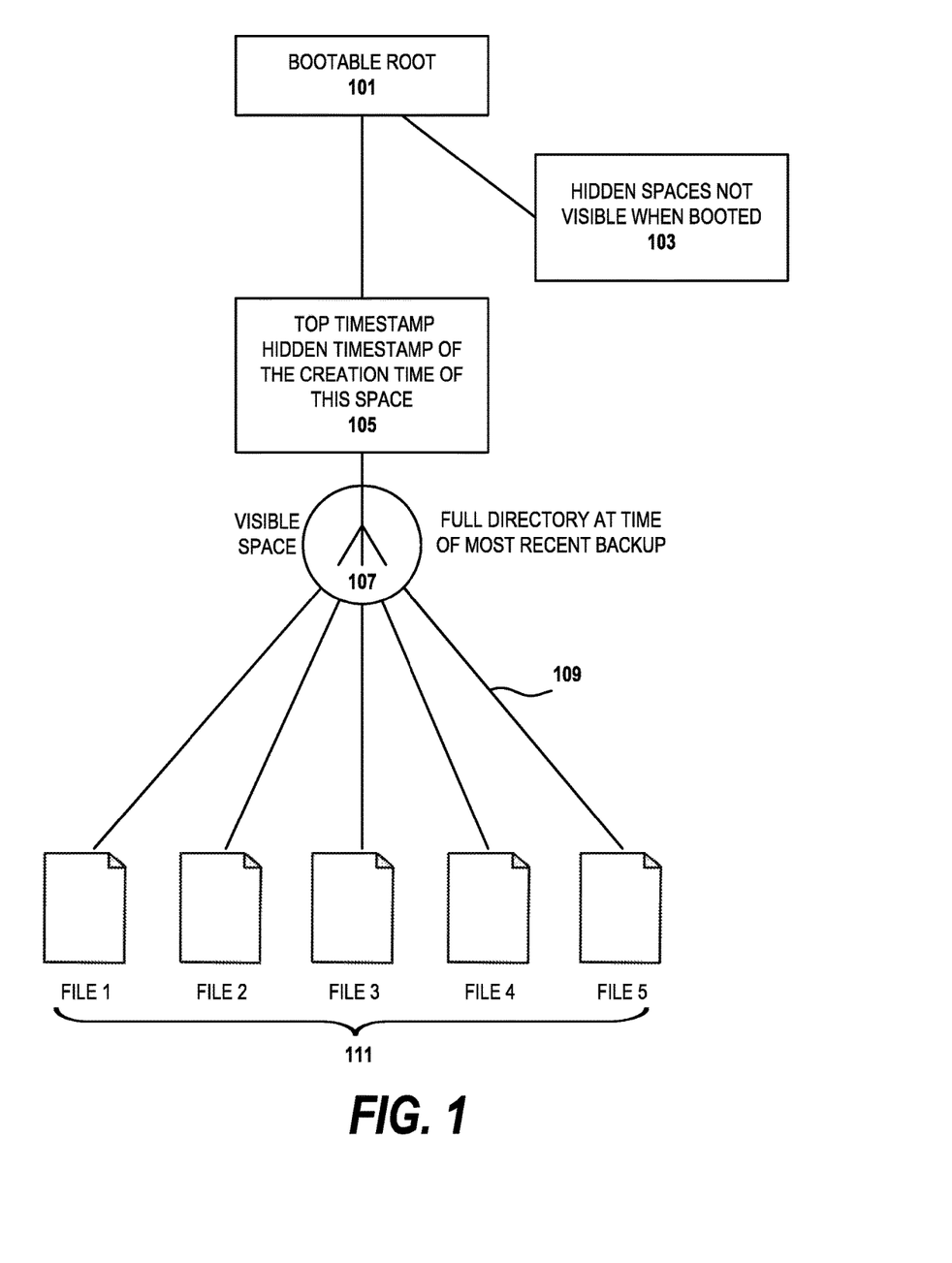
FIG. 1 shows a directory structure diagram that illustrates, in some embodiments, the most recently created Space is not hidden and thus is bootable.
Figure 3:
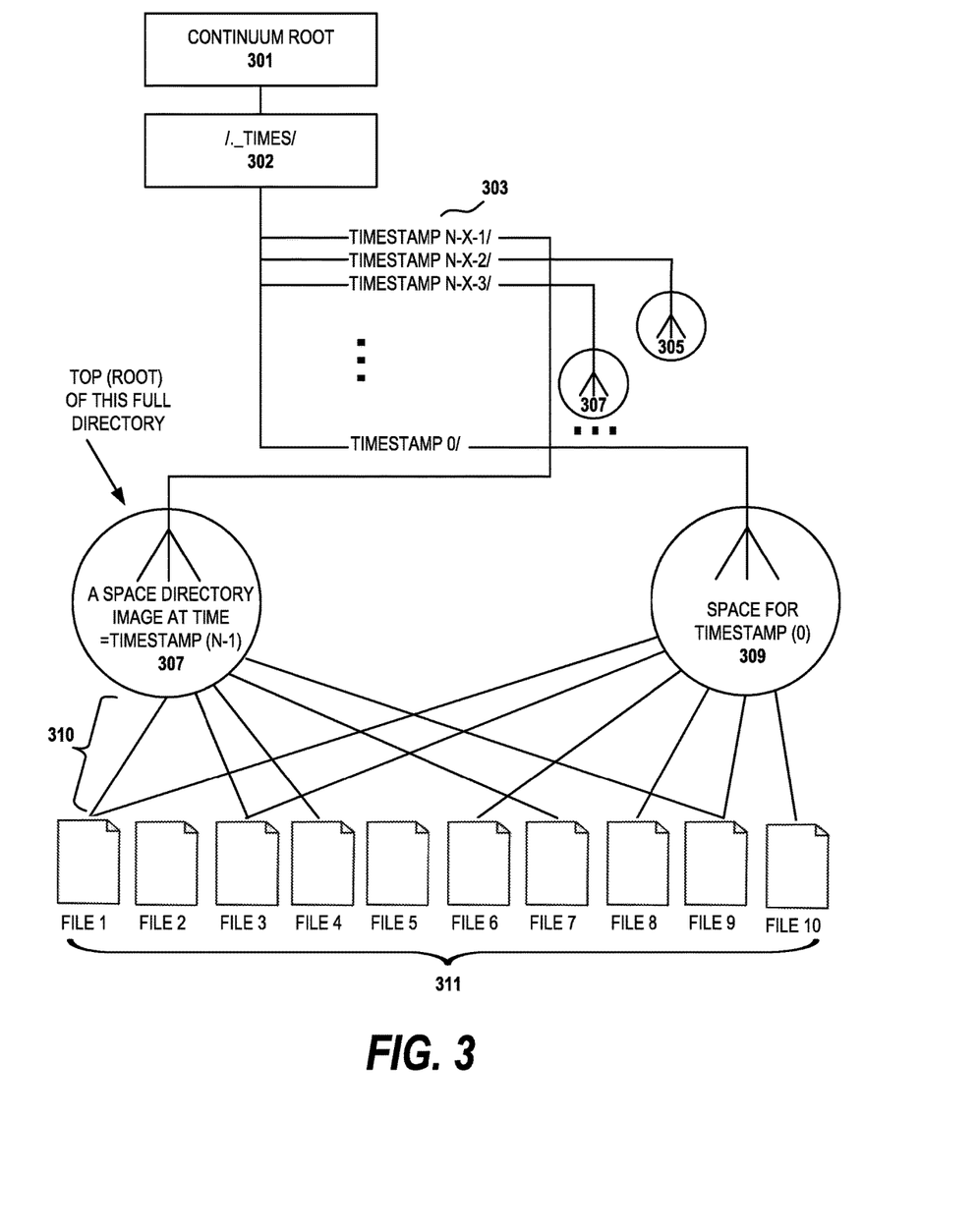
FIG. 3 shows a directory structure diagram for Continuum hidden spaces.
Figure 4:
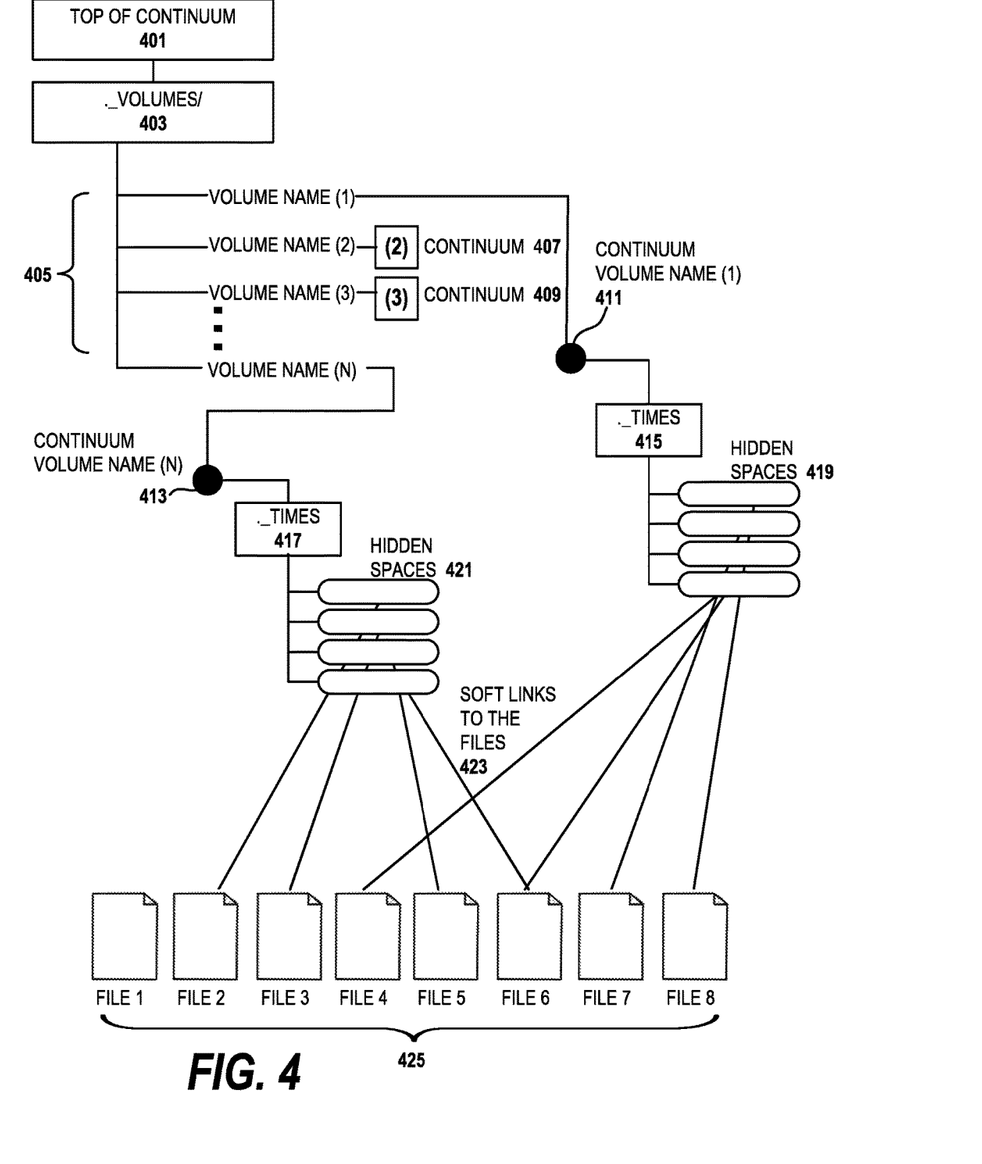
FIG. 4 shows a diagram for using soft partitions according to some embodiments of the invention.

Referring to FIGS. 1 and 4, the top directory is either the root of a physical partition (/) or an arbitrary directory (traditionally foobar/). In FIG. 1, the bootable root 101 and in FIG. 3 the Continuum root 301 are top root directories while shadow directory 107 in FIG. 1 and shadow directories 305, 306, 307 and 309 serve as Spaces for the times (105, 303) when the respective Spaces are created. The shadow directories are useful for creating soft volumes (shadow volumes) in an arbitrary directory on a remote server. In the case of the shadow directories, the top directory is labeled "top" instead of "root". In particular, FIG. 3 shows, according to some preferred embodiments, multiple Spaces (from different times) have soft links to the same set of files.

The most-recent backup is special in preferred embodiments of the invention. It is visible and bootable, while older Spaces in that Continuum are hidden. So the older Spaces will not be seen when the Continuum is booted. In alternative embodiments, generally on larger systems, all Spaces are visible. This enables easily traversing them with standard OS APIs.

As shown in FIG. 3, shadow directories going back in time are grouped in one standard directory called "._times/" 302. Shadow directory names are timestamps in the form of: ._times/yyyymmddhhmm, where yyyy=year, mm=month, dd=day, hh=hour, mm=minute and no seconds. The top directory has a timestamp, _top_yyyymmddhhmm.

The Continuum Creator creates and timestamps one shadow directory for each incremental backup. As depicted in FIG. 1, the most recent backup directory 107 is the top directory. It is not hidden. It is bootable if it is root on a physical partition 101. As depicted in FIG. 3, the most recent backup directory 307 is the top directory referenced by the most recent timestamp N-X-1 303. In preferred embodiments of the invention, shadow directories index all folders/files as of the time of that backup, not just the incrementally backed-up files/folders. This enables sub-second displays of time-specific directories and sub-second "dialing through time" to select a different time as changing times is as fast as changing directories as changing times is changing directories.

Indexing shadow directories is fast and simple. Given the name of each shadow directory is its timestamp locating a selected time is fast and easy. Shadow directories are "hidden" directories. This enables booting a Continuum backup disk. The most recent backup is at the root level. It is visible and what one sees when booting that drive. If the shadow directories were not hidden. The booted disk would not be the image of the most recent backup. If shadow directories were not hidden, standard user interfaces would show all directories and files for all backups for all time which would be an issue for the intended mode of operation for embodiments of the invention.

Since shadow directories hidden, they are not bootable. The Finder will not see them without specifically asking the Finder to do so. This is also the case when using Command Line Interfaces to browse through Spaces at different times.

Shadow directories use symlinks 109, 310 to point to files. Individual files will tend to have existed for a long time, they would be in many shadow directories. They would have many links 109, 310 from many shadow directories pointing to them at once.

Figure 5:
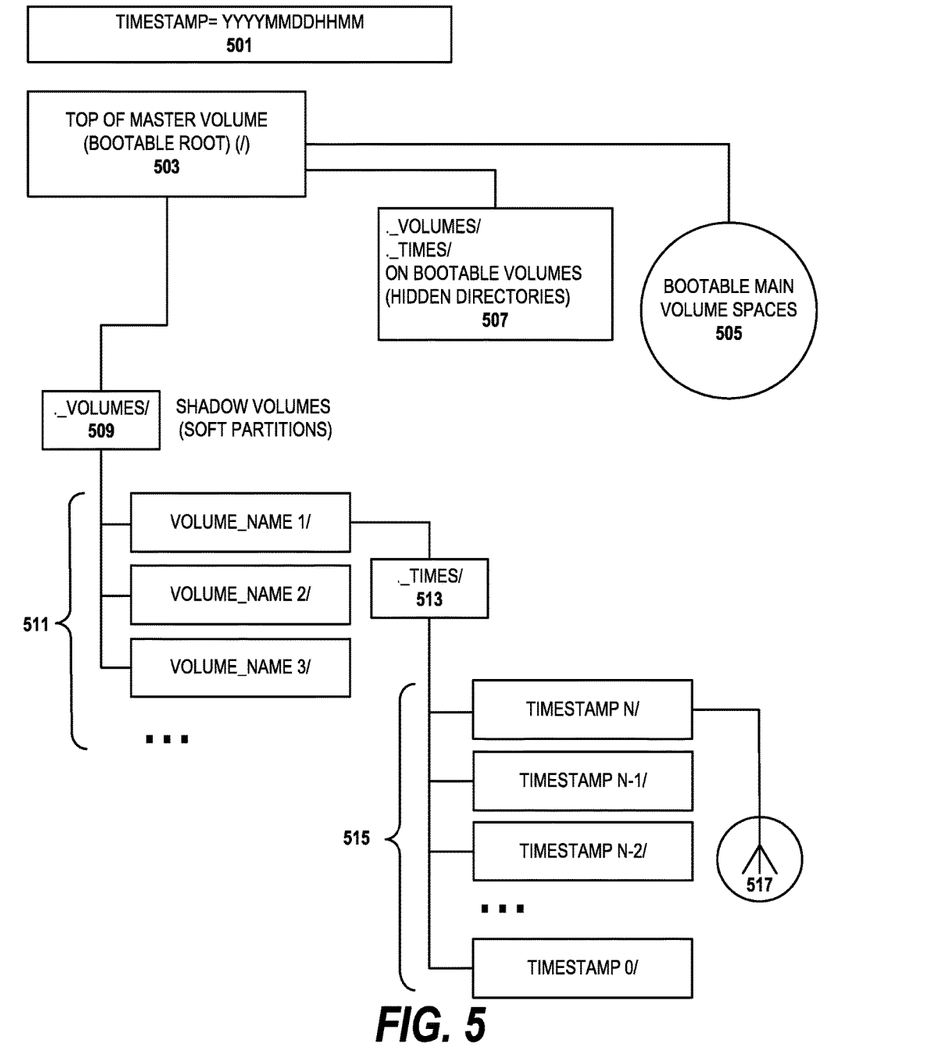
FIG. 5 shows, according to some embodiments, a detailed diagram of the directory structures used to form shadow directories.

Soft Partitions (Shadow Volumes):

As depicted in FIG. 4 (Parallel Universes) and FIG. 5 (Shadow Directory Structure), soft partitions or shadow volumes are used in preferred embodiments of the invention. Shadow volumes are analogous to shadow directories but virtualize volumes instead of virtualizing time. Shadow volumes are hidden directories. In preferred embodiments of the invention, shadow volumes are grouped in a directory called "._volumes/". Creating these volumes does not require physically partitioning a backup disk. The shadow volumes share storage capacity across multiple soft volumes. A soft partition is a hidden directory with one or more named volumes in that directory. A user can select a shadow volume as if it were a physical volume (physical partition). Normal shadow directories reside beneath a shadow volume.

The soft partitions implementation for the "parallel universes" (multiple logical volumes in a single physical volume) embodiment of the invention is depicted in FIG. 4. In particular FIG. 4 shows, according to some embodiments, multiple Volumes (soft partitions) with soft links or symlinks to the same set of files. The root directory and top of the continuum 401 links to the volumes/directory 403 which serves the function of hiding the individual shadow volumes 407, 409, 411, 413. There is one shadow volume directory for each soft partition (logical volume). This arrangement allows the Continuum Creator to backup multiple physically smaller volumes into one physically larger volume without having to create hard partitions.

Similar to the arrangement discussed above with the Spaces, only the top (root) volume 401 is bootable. That volume is not hidden in a shadow-volume directory. As shown, volumes directory 403 has a catalog of shadow volume names 405. The shadow volume names 405 may take the form of _volumes/volume_name. Each shadow volume refers to a particular Continuum. In preferred embodiments of the invention, there are hidden "time" directories 415, 417 in each Shadow_volume 411, 413. The time directories contain a catalog of Space names in the particular Continuum. The Space name may have the format of ._volumes/volume_name/._times/yyyymmddhhmm which represents a timestamp for the particular Space. Using this naming format, the timestamp for Shadow_volume root directory is ._volumes/volume_name/._top_yyyymmddhhmm.

The Continuum Navigator directory-structure has a top directory 411 which includes all the files and directories from the latest backup. They are in the "top" directory. The "top" directory is a bootable "root" directory of it is at the top of a physical partition 401. The top directory also includes a hidden._times/directory 415. The ._times/directory included on shadow directory for each incremental backup. The Space name for a given Space may take the form of .times/_.timestamp/. These Spaces 419 are time stamped by using their timestamp as their directory name. Below each shadow directory 419 is the complete image of the backed-up filesystem as it was at the time of that backup. These directories 419 use symlinks 423 or other soft links to the files 425.

Optionally, as shown in FIG. 5, the top directory 503 includes a ._volumes/directory 509 that houses volume names 511 each having a respective name of the format of: ._volumes/._volumenames/which point to a respective volume which are Soft partitions 511. Each volume directory/soft partition is the top directory for that volume. Each soft partition uses Continuum Navigator's shadow-directory structure to create one shadow directory (a Space) per incremental backup as described above. The Space shadow directories are indexed in the times/directory 513 by their respective timestamps names 515. A respective timestamp name points to the corresponding Space, e.g., Space 517. The timestamp may take the form of Timestamp=YYYMMDDHHMM as shown in box 501. The top shadow-volume directory (._volumes/) can reside in any arbitrary directory. Thus, any directory on a remote server or a local server can be a repository for Continuum Navigator backups. In preferred embodiments of the invention, on bootable volumes 507 the ._volumes/and ._times/directories are hidden while on non-bootable volumes 507 the ._volumes/and ._times/directories are visible. Block 505 represents the bootable main volume Spaces.

Shadow directories enable backing up onto local-external disks, local NAS, and/or remote storage in preferred embodiments of the invention. Backup images may be copied to larger partitions if storage space is tight in a current hard partition. Alternatively, the system backups onto a partition on a new disk as if it were the in the previous one. As long as the volume name is the same, the Continuum Creator will treat the new volume as if it were the old volume. This functionality is not available in other systems, such as Time Machine.

Background Tasks

In preferred embodiments of the invention, backups of data are performed automatically, periodically, and silently. In an account with administrative privileges, the Continuum Daemon starts at runtime and continues running. The Daemon performs periodic tasks such as incremental backups, monitoring available capacity and running garbage collection when available capacity is low.

"Search Through Time"

The dual Continuum-Finder windows are used in preferred embodiments of the invention. One window displays the present time space. Users navigate to a desired starting directory and click on a "Start here" button. The past-time window displays a mirror of that directory with a Time Dial to dial back through time. When the user reaches the desired place and time, the user may drag and drops files/folders from the past window to the present window to recover files.

Without specifying specific times using the Time Dial, the Continuum Navigator searches back in time to find folder names, file names, contents in files. In preferred embodiments of the invention, it includes many search parameters with Boolean logic, e.g., File/folder names, dates and file content. Settable search scope using the entire volume or a particular folder are used in embodiments. The interface lists all files/folders at all times that match the search criteria and in one embodiment allows the user to double click on one of them to view them in their directory in a Finder window. An OS X Finder window may be used on a Mac; a Continuum-Finder window may be used on Linux. A Windows Explorer or Continuum-Finder window can be used on Windows. In embodiments of the invention, searching through time is as quick and easy as searching through any filesystem.

Portability:

Embodiments of the invention are designed to be compatible across OS X, Windows, Linux, and Unix (System V and BSD) operating systems. Preferred embodiments of the Continuum Creator require operating system and filesystem support of file hard links, symlinks, or similar links to files. Symlinks are useful because Continuum directories and other directories and files can reside on different volumes.

Easy to Use

Preferred embodiments of the invention are designed with intuitive, obvious, simple, and highly functional user interfaces. In embodiments, guided tours are used in place of manuals. The guided tours "walk" the user through every step in the process, asking them to fill in the blanks. Minimum-click interfaces, e.g., a simple, one click to setup initial backup, are used (not including downloading, installing, and starting the application.) The interface is designed with little to no text to enter other than the system password and to minimize the number of clicks to perform operations. For example, three clicks can be used to restore files and/or folders by selecting the time from which to restore and dragging and dropping files and/or folders and four clicks to perform a full restore Simple interfaces are used in preferred embodiments of the invention to setup backups, restore files/folders, or restore a complete volume. An example simple interface detailed below. However, alternative embodiments could implement different GUIs to accomplish the same tasks.

Versatility

The invention is versatile as it is able to backup from a live external volume to a backup external volume or backup to multiple physical or logical volumes. When multiple backup volumes are mounted, in one embodiment, Continuum Creator uses round-robin logic to select which to use for a given backup. Using Shadow Volumes, the Continuum Creator can backup to network volumes (NAS). This is facilitated by the Continuum Creator's ability to create shadow volumes in any user directory.

Incremental Backups, Shadow Directories and Soft Partitions

Continuum Creator performs the incremental backups by using one of the well-known methods of comparing differences between the most recent backup and the current filesystem. In preferred embodiments of the invention, the method for incremental backups is as follows: On the backup volume, move the top directory into a new (most recent) shadow directory. Then, use the top-volume timestamp (._top_timestamp/) to create a shadow-directory with that timestamp name. Next, move (mv) each visible subdirectory in the top directory to the new shadow directory. The system then creates a new top-volume timestamp ((._top_timestamp/) for the current time. The top directory is now ready to populate with a mirror of the source volume.

To populate the top directory, the system compares the source of the most-current shadow directory. For each source directory, the system creates a directory in the top directory for each of those directories that have a matching shadow directory. For each file in that directory, if the file exists in both places, the system creates a hard link in the top director that points to the file in the shadow directory. If the file exists in the source directory and not in the shadow directory, the system copies the file to the top directory. If the file in the source directory is newer than the file in the shadow directory, the system copies that file into the top directory. The top directory is now a mirror of the source directory, and only new and modified files were copied.

Preferred embodiments of the invention create soft partitions from a user interface option, e.g., using a pull-down option. The user select a mounted volume on which to create a soft partition, e.g., a locally attached backup volume or the root-level of a NAS-attached volume. Alternatively, the user selects a directory in which to create the soft partition either by navigating a mounted remote-filesystem interface or entering the directory name. When the user clicks on a "Create soft partition" option in the pull down, the system stores the partition/NAS/remote-filesystem volume name. The system then stores the directory name for soft partitions in directories and stores the soft-partition volume name(s) within the partition or directory.

In preferred embodiments of the invention to mount soft partitions, the system mounts the physical-backup disk or a NAS disk that contains that soft partition. The Continuum Creator will add all of that disk's soft partitions to its list of backup partitions.

To mount a soft volume that is in a directory, the system mounts the volume (local/remote filesystem) that contains that soft volume in response to a user selection of a pull down menu to "Mount soft partition." For example, the user selects a mounted filesystem, enters the directory name that contains that soft directory and selects a "Mount" from an interface.

Garbage Collection

Pruning older backups may become necessary to maintain sufficient backup capacity in the system. In preferred embodiments of the invention, the system preferentially keeps more (more frequent) backups which are more recent in time and keeps fewer (less frequent) backups farther back in time. As an example, one embodiment of the invention would keep every shadow directory for the first day, that is, the present day. The system would keep hourly shadow directories for a preceding week and daily shadow directories for a month. Weekly shadow directories would be kept forever. The system would retain the first (oldest) shadow directory.

Garbage collection is triggered by volume capacity falling under safe targets in embodiments of the invention. To make garbage collection efficient, the system reviews files in the shadow directory that has been selected to delete. It looks for given files at the next-earlier time and/or the next-later time. With those to comparisons, the system determines whether other shadow directories point to that file. Most files will be duplicates. This process is repeated for the set of files. For a very few files (ones unique to that shadow directory), the system may searches for that file through all previous times to determine its uniqueness. Typically, the number of file-exists tests is only slightly larger than the number of files in the shadow directory in question.

In preferred embodiments of the invention, the garbage collection procedure is as follows: Continuum Creator scans for mounted volumes with less than the specified capacity headroom. Next, a shadow folder to be deleted is selected implementing the culling algorithm above. For every file and folder in that shadow directory, the system looks for that item in the shadow directory one-level sooner. If it exists, the system does not take action as other shadow directories are linked to that file so the system cannot delete it in garbage collection.

Next, the Continuum Creator goes onto the next item/file in the shadow directory. If it does not exist, it did not exist until the current shadow directory. Therefore, there is no need to look at earlier times, but the system does need to look at later times. The system continues this process for files referenced in the shadow directory. It search back in time until it finds a match and stops if a match is found, indicating that the file exists in another shadow directory. Then, the system goes onto the next item in the shadow directory. If you reaches the oldest shadow directory without finding another reference to the file, there are no other links to it and the system can delete it in garbage collection. Once all the appropriate files are deleted (those that had only one link), the system deletes that shadow directory.

Control-panel Functions

In preferred embodiments of the invention, a set of control panel functions are presented in the user interface.

In a "Setup" function, the user can select the source volume for the backup. The system volume is the default source volume. The user can select external-disks as source of backups. Alternative, the user can select multiple disks to backup. As another aspect of the "Setup" function, the user can forbid backing up to the system volume and select a target backup volume from mounted volumes.

In embodiments of the invention, if only one external volume is mounted, the system selects it as the default target. The system can query the user if they want to use that volume as a Continuum volume. Mounted volumes can include soft partitions (shadow volumes), if the selected target volume is not already a Continuum volume. The system can warn the user that all data on the target volume will be deleted.

When the system reformats the target volume, for hard (physical) partitions it can use an appropriate operating system utility to reformat the drive, e.g., Mac OS Extended (Journaled), NTFS, or ext4 format (depending on the flavor of the operating system). For soft (shadow volume) partitions, the system can deleted all files and directories that are below the top directory and then create._times/._volumes/, and._volumes/_times/directories.

The user interface presents setup options per hard or soft partition; the system will use the default settings unless the setup options are modified by the user. Continuum Navigator maintains master default settings to apply to all volumes and these defaults can be altered for each volume. For preferred embodiments of the invention, the settings include: frequency and time of backups per backup volume, notifications (on or off), an email address for notifications, conditions for notifications such as send notification after each run competes normally (yes, no), send notification only abnormal terminations, send notification if volume is missing at start time and so forth.

The user interface may also present a warning that the system is approaching the threshold where Continuum Creator will delete backups to maintain sufficient working space. It may also present which backups Continuum Creator will delete or has deleted to maintain sufficient free space.

The user interface may also present what action to take if a volume is missing at the scheduled backup time. For example, the system can be set to run backup or restore as soon as it is connected (or not). In preferred embodiment of the invention, the default would be to run the backup and restore. The user can configure whether a full restores by reformatting the target volume (as specified above) should be performed or whether an incremental backup to the target volume should be performed if this accomplishes a full backup and restore.

Continuum Time Dial

The "Time Dial" is illustrated in FIG. 6. The "Time Dial" allows a user to quickly and intuitively navigate back through time. In preferred embodiments of the invention, it shows only those times with backups, e.g., in shadow directories. Each displayed time is a time for each shadow directory; it does not display times not in the shadow directories. In preferred embodiments, shadow directories are named by their timestamp and so it is easy and fast to determine the times to show and not to show in the Time Dial. As shown in FIG. 2, the Time Dial is displayed above the past-time Continuum-Finder window in some embodiments. The user can dial back to the desired time to selected files and/or folders. When the user changes to a new time in the time dial Continuum Navigator changes to the directory with that timestamp.

The dial displays years, months, days, hours, and minutes, no seconds, and AM/PM. In the preferred embodiment, timestamps use a 24-hour clock (0:01 to 24:00 hours). This is displayed in either AM/PM format or 24-hour format. This is a configurable option with AM/PM as the default. The "year" dial starts in the first year of backups. When selecting a year, the Time Dial displays earliest month when backups are present; when selecting a month, the Time Dial displays earliest day when backups are present. When selecting a day, it displays earliest hour when backups are present. When selecting an hour, it displays earliest minute when are backups are present. Times for which there are no corresponding backups are not shown or are shown in gray. The default time is the current time. As shown in FIG. 6, the Time Dial displays a three time units before and three time units after the currently selected time.

FIG. 6 shows the "Time Dial" used in preferred embodiments of the invention. Independent columns are used for years/months/days/hours/minutes. This example shows a simplified case with a few backups before and after the target date. In most cases the times between these backups would be more granular. As depicted, the user time selected is May 15, 2013 at 12:52 PM. Given the selection of 2013 as the year, the user can see that backups are available for at least March, April, May, June and July for that year. Given the selection of May (2013), the user can see that there are backups available for at least May 8, May 12, May 15, May 20 and May 23 (2013). In this illustrative case, there were no backups between these times, but those skilled in the art would recognize that in most actual uses of the invention, there would be much more frequent backups, possibly many per day.

By using, i.e. manipulating, the displays for Days, Hours, and Minutes the user interface makes it easy to find the desired time from which to restore files. To find a particular minute, the user dials back only minutes; to find a particular hour, the user dials back only hours. To find a particular day, the user dials back only days; to find a particular month, the user dials back only months and/or years. The user adjust the dials by clicking and dragging the bars, using a mouse, or using touch-pad gestures (two-finger scroll on Macs).

In preferred embodiments of the invention, where there are multiple backup volumes mounted, the Time Dial indicates on which backup volume it will dial back in time. The user can select among the mounted volumes. By pulling down to a list of mounted backup volumes and determine which top-directory to use.

Embedding Continuum Navigator in Native Finders

In preferred embodiments of the invention, Continuum Navigation could be integrated as a modification to an operating system rather than starting as an application. In these embodiments, a user could add a Time Dial icon system menu. Then at any time a user could dial back in time. When they click on the icon it opens a duplicate folder and brings up the dial. The user dials and then drag and drops. A separate application for full restores would still be necessary.

Preferred embodiments of the invention do not use any operating system or file system code, and thus would not require OS or filesystem licenses to develop an implementation.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation.

Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method for time based protection of data stored in a source volume of a computer system comprising:
    performing a set of backups for the computer system, each backup a full image for a respective backup time, wherein each backup of the set of backups is an incremental backup;
    storing the set of backups in a filesystem format, each respective backup stored as a directory in a directory structure;
    associating a respective timestamp with each backup, wherein the respective timestamp is representative of the respective backup time;
    indexing the set of backup directories according to the associated timestamps;
    reading a time stamp associated with a top backup directory that stores a previously stored backup of the data;
    creating a shadow top directory, wherein a name of the shadow top directory is associated with the time stamp;
    moving at least one subdirectory under the top backup directory to the shadow top directory;
    creating a time stamp corresponding to the current time for a new backup and associating the time stamp with the top backup directory; and
    for each source subdirectory under the source volume, performing a backup of the source subdirectory into a corresponding backup item under the top backup directory.

2. The method of claim 1, further comprising:
    presenting a backup for a selected backup time in a user interface window, wherein respective files in the backup are presented as a set of selectable user interface elements; and
    responsive to selection of a respective user interface element, presenting a first file corresponding to the selected user interface element from the backup by an application used for handling the first file.

3. The method of claim 1, further comprising:
responsive to a restore request, using a full image for a requested backup time, wherein the filesystem image for the requested backup time is not recreated during a restore process.

4. The method of claim 1, wherein the directory structure is arranged as a top directory having a set of shadow directories, each shadow directory storing a respective backup for a respective backup time, wherein the top directory and shadow directories are standard file system directory structures.

5. The method of claim 4, wherein the top directory is a most recent backup and wherein the top shadow directory is visible and bootable.

6. The method of claim 5, wherein the set of shadow directories are hidden directories.

7. The method of claim 1, further comprising searching the set of backup directories for a selected search term.

8. The method of claim 1, further comprising providing a restore interface, wherein the restore interface includes:
a present time window displaying data items at the present time, wherein the present time window enables a user to select a selected item under the source volume;
a time dial that enables a user to select a backup time that corresponds to a time stamp from a plurality of time stamps under which a backup of the selected item exist; and
a backup window, wherein the backup window displays the backup of the selected item at the selected backup time.

9. The method of claim 8, further comprising enabling a user to select a sub item in the backup window for being restored.

10. The method of claim 9, wherein enabling the user includes enabling the user to drag the sub item under the backup window and drop it into the present time window.

11. A system for time based protection of data stored in a source volume of a computer system, comprising:
a processor;
computer memory holding computer program instructions executed by the processor for performing database maintenance, the computer program instructions comprising:
program code, operative to perform a set of backups for the computer system, each backup a full image for a respective backup time , wherein each backup is an incremental backup;
program code, operative to store the set of backups in a filesystem format, each respective backup stored as a directory in a directory structure;
program code, operative to associate a respective timestamp with each backup, wherein the respective timestamp is representative of the respective backup time;
program code, operative to index the set of backup directories according to the associated timestamps;
program code, operative to read a time stamp associated with a top backup directory that stores a previously stored backup of the data;
program code, operative to create a shadow top directory, wherein a name of the shadow top directory is associated with the time stamp;
program code, operative to move at least one subdirectory under the top backup directory to the shadow top directory;
program code, operative to create a time stamp corresponding to the current time for a new backup and associating the time stamp with the top backup directory; and
program code, operative to perform a backup of the source subdirectory into a corresponding backup item under the top backup directory.

12. The system of claim 11, further comprising program code, operative to provide a restore interface, wherein the restore interface includes:
a present time window displaying data items at the present time, wherein the present time window enables a user to select a selected item under the source volume;
a time dial that enables a user to select a backup time that corresponds to a time stamp from a plurality of time stamps under which a backup of the selected item exist; and
a backup window, wherein the backup window displays the backup of the selected item at the selected backup time.

13. The system of claim 11, further comprising:
program code, operative to present a backup for a selected backup time in a user interface window, wherein respective files in the backup are presented as a set of selectable user interface elements; and
program code, responsive to selection of a respective user interface element operative to present a first file corresponding to the selected user interface element from the backup by an application used for handling the first file.

14. The system of claim 11, further comprising program code responsive to a restore request, operative to use a full image for a requested backup time, wherein the filesystem image for the requested backup time is not recreated during a restore process.

15. The system of claim 11, wherein the directory structure is arranged as a top directory having a set of shadow directories, each shadow directory storing a respective backup for a respective backup time, wherein the top directory and shadow directories are standard file system directory structures.

16. The system of claim 15, wherein the top directory is a most recent backup and wherein the top shadow directory is visible and bootable.

17. The system of claim 11, further comprising program code, operative to searching the set of backup directories for a selected search term.

18. A computer program product in a non-transitory computer readable medium for use in a data processing system, the computer program product holding computer program instructions executed by the data processing system for performing time based protection of data stored in a source volume of a computer system, the computer program instructions comprising:
program code, operative to perform a set of backups for the computer system, each backup a full image for a respective backup time , wherein each backup is an incremental backup;
program code, operative to store the set of backups in a filesystem format, each respective backup stored as a directory in a directory structure;
program code, operative to associate a respective timestamp with each backup, wherein the respective timestamp is representative of the respective backup time;
program code, operative to index the set of backup directories according to the associated timestamps;

program code, operative to read a time stamp associated with a top backup directory that stores a previously stored backup of the data;

program code, operative to create a shadow top directory, wherein a name of the shadow top directory is associated with the time stamp;

program code, operative to move at least one subdirectory under the top backup directory to the shadow top directory;

program code, operative to create a time stamp corresponding to the current time for a new backup and associating the time stamp with the top backup directory; and program code, operative to perform a backup of the source subdirectory into a corresponding backup item under the top backup directory.

19. The computer program product of claim 18, further comprising:

program code, operative to present a backup for a selected backup time in a user interface window, wherein respective files in the backup are presented as a set of selectable user interface elements; and program code, responsive to selection of a respective user interface element operative to present a first file corresponding to the selected user interface element from the backup by an application used for handling the first file.

20. The computer program product of claim 18, further comprising program code, operative to provide a restore interface, wherein the restore interface includes:

a present time window displaying data items at the present time, wherein the present time window enables a user to select a selected item under the source volume;

a time dial that enables a user to select a backup time that corresponds to a time stamp from a plurality of time stamps under which a backup of the selected item exist; and a backup window, wherein the backup window displays the backup of the selected item at the selected backup time.

* * * * *